Sept. 6, 1932.  J. BETHUNE  1,876,388

TWO-SPEED DRIVE AXLE

Filed Sept. 16, 1929

INVENTOR
John Bethune
BY Whittemore Hulbert
Whittemore & Belknap
ATTORNEYS

Patented Sept. 6, 1932

1,876,388

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

TWO SPEED DRIVE AXLE

Application filed September 16, 1929. Serial No. 392,968.

The invention relates to two speed transmission gearing more particularly designed for use in connection with two speed driving axles of motor vehicles, and the invention consists in the construction as hereinafter set forth.

In the construction of driving axle for motor vehicles it is usual to provide a differential gearing arranged centrally within the axle housing and driven by a bevel ring gear which in turn is driven by a bevel pinion on a shaft actuated by the propeller shaft of the vehicle. With my improved construction I utilize these standard parts but provide a two speed driving mechanism for the bevel pinion, the construction being as follows:

A is a portion of the axle housing which encloses the differential gear and ring gearing, not shown. B is the bevel pinion for driving the ring gear which is preferably integral with a shaft C journaled in radial and end thrust bearings D in the axle housing. E is a lateral extension of the axle housing in which is journaled a drive shaft F in axial alignment and stepped engagement with the shaft C. The outer end of this shaft is journaled in a bearing G in the housing E and is suitably connected with a head H for coupling the same with the propeller shaft. The shaft F intermediate the bearing G and the shaft C has a spline portion on which is slidably mounted a gear wheel I. This is preferably a herringbone gear having the oppositely inclined tooth portions I' I² spaced by a central groove I³. The shaft C has its outer end portion splined as indicated at C' to correspond to the splined portion of the shaft F. Parallel to the shaft F is a counter shaft J preferably a sleeve mounted upon a stationary supporting shaft K secured in bearings in the housing E. At the outer end of the shaft J is an enlarged splined head portion L and at the inner end of the shaft is a gear wheel M preferably integral therewith and preferably a herringbone gear. The gear wheel M is in constant mesh with a gear wheel N which may be formed as shown of two adjacent members both keyed upon the shaft C, and clamped between the ring O and the lock nut O'. P is a herringbone gear slidably mounted on the shaft J and splined for clutching engagement with the splined head L when shifted into registration therewith. The gear wheels I and P being both herringbone gears will be coupled to each other so that the longitudinal shifting of one of said gears will carry the other gear with it. This longitudinal shifting is effected by a shifter fork Q mounted on a shifter rod R slidable in the casing E, said fork engaging the groove I³ between the sections I' and I² of the gear I.

Figure 1:
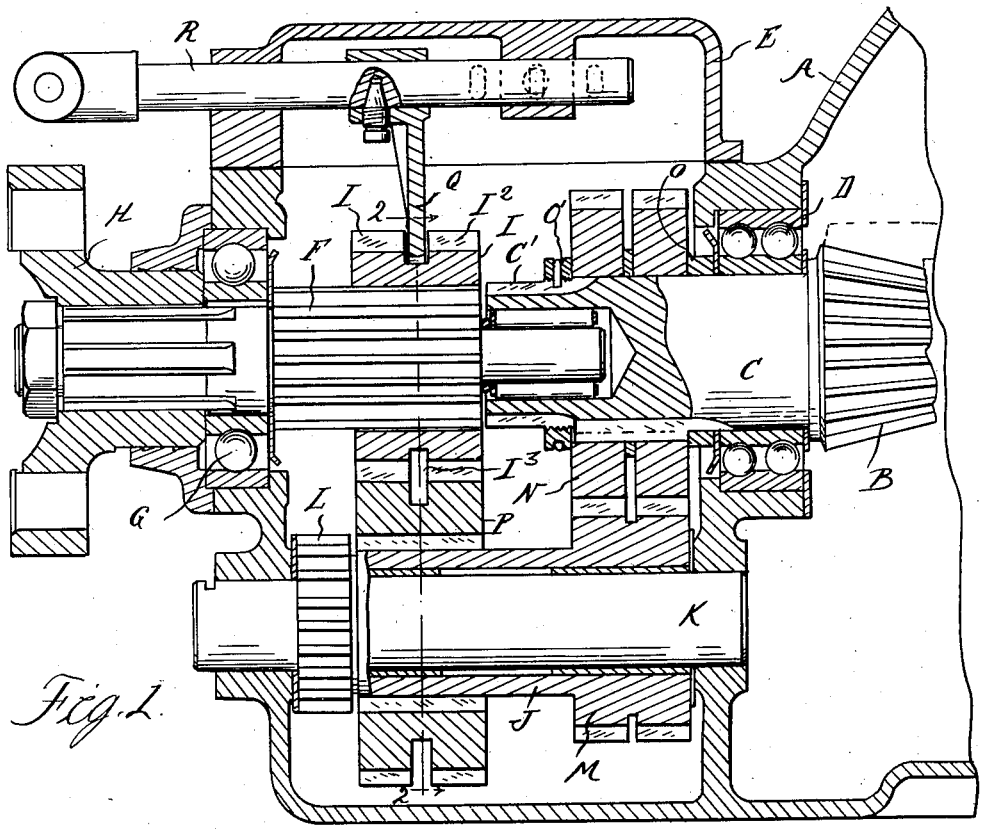
Figure 1 is a cross section through a portion of a drive axle housing showing the differential driving gear and my improved two speed transmission in connection therewith.
Figures 2, 3:
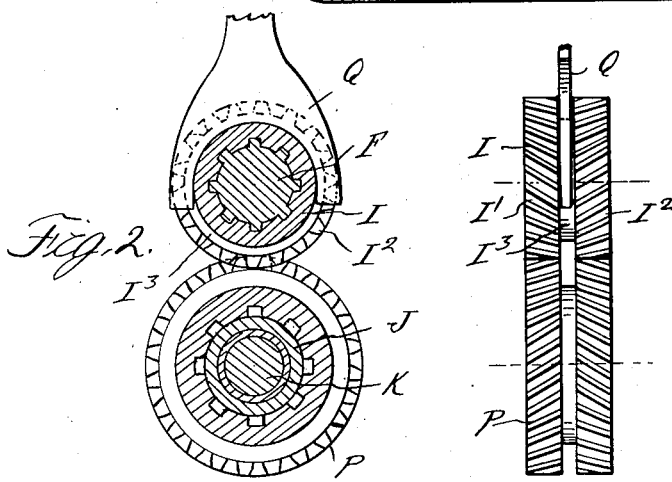
Figure 2 is a cross section on line 2—2 of Figure 1.
Figure 3 is an elevation of the parts shown in Figure 2.

With the construction as described when the parts are in the position shown in Figure 1 the drive shaft F is disconnected from both the shaft C and the countershaft J, inasmuch as the gear wheel P is freely revoluble upon said counter shaft. To adjust the mechanism for low speed transmission the shifter R is moved outward and through the fork Q will shift the gear wheel I outward upon the splined portion of the shaft F. This movement will also carry outward the gear wheel P so that the splines of this gear wheel will form a clutching engagement with the splined head portion L of the shaft J, thereby driving said shaft and through the gear wheels M and N driving the shaft C. As these gear trains form a step-down or reduction gearing the shaft C will be revolved at a lower angular speed than the shaft F.

To adjust the mechanism for high speed transmission the shifter R is moved inward causing the fork Q to move both the gear wheels I and P in an inward direction. This shifts the gear wheel I on the splined portion of the shaft F and into engagement with the splined portion C' of the shaft C. This will form a direct clutch engagement between the shafts F and C and drive them at the same angular speed.

The construction as above described is exceedingly compact and simple and comparatively inexpensive to manufacture.

What I claim as my invention is:

A motor vehicle drive axle comprising the axle housing and a lateral extension thereof, a differential gear driving pinion, a shaft therefor, a driving shaft in alignment and in stepped engagement with the pinion shaft and within the extension of said housing, said driving shaft and pinion shaft being provided with corresponding and adjacent spline portions, a herringbone gear having a groove and being slidable on the spline portions of said drive shaft and engageable with the spline portion of the pinion shaft for directly coupling said shafts, a counter shaft parallel to said aligned shafts, a herringbone gear slidable on said counter shaft and intermeshing with said first mentioned gear, a splined head on said counter shaft engageable with the gear on said shaft when said gears are shifted to disengage said first mentioned gear from said pinion shaft, a constant mesh gear train between said counter shaft and the pinion shaft and in connection with said first mentioned intermeshing gears constituting a step down or reduction gear train, a shifter slidable in the extension of said housing and a shifter fork engaging the groove in said first mentioned herringbone gear intermediate the two oppositely inclined tooth portions thereof whereby said gear may be shifted to alternatively drive said pinion shaft directly from the drive shaft or through the medium of said gearing.

In testimony whereof I affix my signature.

JOHN BETHUNE.